Nov. 25, 1969     K. L. POYNTER     3,479,705
MOLDING APPARATUS
Filed Dec. 15, 1966     3 Sheets-Sheet 1

INVENTOR
KENNETH L. POYNTER

Newton, Hopkins,
Jones & Ormsby
ATTORNEYS

3,479,705
MOLDING APPARATUS
Kenneth L. Poynter, Conyers, Ga., assignor, by mesne assignments, to Miami Brick and Stone, Inc. of Miami, Miami, Okla., a corporation of Oklahoma
Filed Dec. 15, 1966, Ser. No. 601,972
Int. Cl. B28b 1/08
U.S. Cl. 25—41          10 Claims

ABSTRACT OF THE DISCLOSURE

The disclosure herein is directed to an apparatus for molding concrete products from a mix of concrete having an appreciable slump. The device accomplishes this by providing a mold defined by separate portions, each portion being effective for selective and independent vibration. The products are molded by first filling the mold while the portions are positioned together and simultaneously vibrated, and by subsequently separating the portions while the portion of the mold not supporting the molded product is vibrated.

---

This invention relates generally to a method of and apparatus for molding plastic materials such as concrete and is more particularly related to the molding of a mix of concrete having an appreciable slump.

Many concrete casting machines are available on the market today for the molding of concrete products. These machines are, however, limited to the use of a mix of concrete having substantially no slump. The use of this mix of concrete necessitates the application of pressure to the mix of concrete while in the mold in addition to vibration of the mold to achieve the desirable compaction in the resulting concrete product.

The necessity of the application of pressure to the mix can be eliminated through the use of a mix of concrete having an appreciable slump; however, the only previously satisfactory molding or casting operation for this mix of concrete was a hand operation. This is because previous molding machines causes the formed product to deteriorate during the removal of the product from the molding machine. These hand operations, while being satisfactory for the molding of a mix of concrete having an appreciable slump, are so expensive and time consuming that the operation cannot be effectively used on a large scale.

The invention disclosed herein overcomes these and other problems associated with prior art devices and methods of molding plastic materials such as concrete by providing a method of and means for mechanically molding or casting a mix of concrete having an appreciable slump. This is done by vibrating the male portion of the mold independently of the female portion of the mold and vibrating the female portion of the mold independently of the male portion of the mold. The male mold may also be joined with the female mold for simultaneous vibration of both molds. By providing the aforementioned vibrations in a selectively predetermined manner, the amount of slump in the resulting concrete products can be selectively controlled so that the desired product will be obtained without the previously encountered deterioration of the product during the removal of the mix of concrete having an appreciable slump from the molding machine.

The apparatus of the invention includes an upper female mold and a lower male mold provided with a conveyer assembly for transporting pallets, on which the finished product is carried, between the upper and lower molds. The lower mold is movable and effective to position a pallet against the bottom of the upper mold for the molding of a product.

A hopper is provided immediately above the upper female mold for the receipt of material to be molded by the machine and is provided with a pair of movable gates at the bottom thereof to control the flow of material into the upper female mold.

The upper female mold is isolated from the frame of the apparatus and is provided with a vibrator so that the female mold can be independently vibrated. The lower male mold is isolated from the frame and is provided with a vibrator so that it can also be independently vibrated. When the male mold carries the pallet upwardly against the female mold, the vibrator on the lower male mold is effective to vibrate both the female mold and the male mold simultaneously.

These and other features and advantages will become more apparent upon consideration of the following drawings and specification wherein like characters of reference designate corresponding parts throughout and in which.

Figure 1:
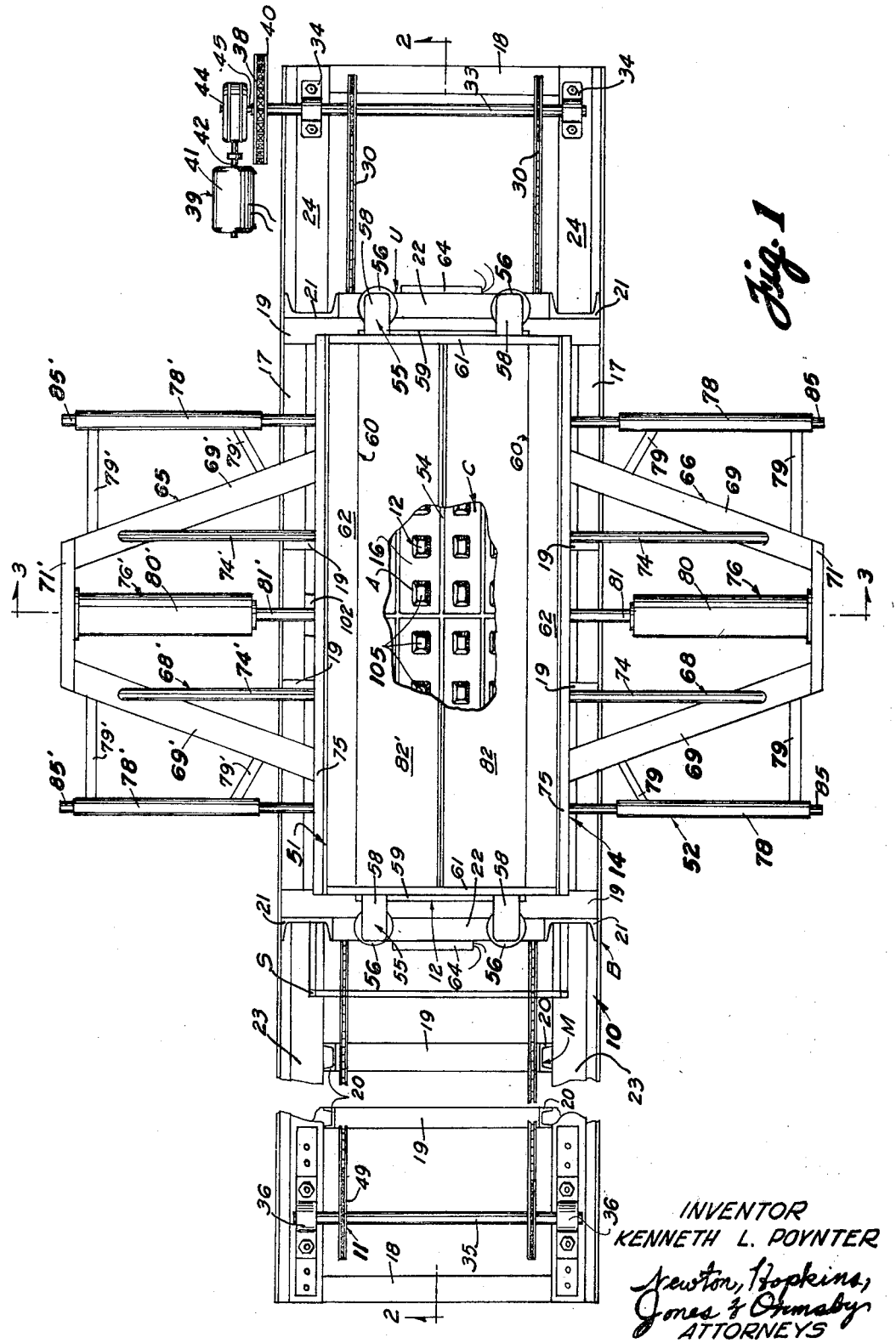
FIG. 1 is a top plan view of one embodiment of the invention.

These figures and the following detailed description disclose one embodiment of the invention, however, the inventive concept is not limited thereto since it may be embodied in other forms.

Referring to the figures, it will be seen that the apparatus of the invention comprises generally a frame 10 having a conveyor assembly 11 and a molding assembly 12 thereon. The molding assembly 12 comprises generally an upper mold assembly 14 and a lower mold assembly 15. The conveyor assembly 11 is effective to move a pallet 16 between the upper mold assembly 14 and the lower mold assembly 15 as best seen in FIG. 2 so that the pallet 16 may be picked up by the lower mold assembly 15 and moved upwardly against the upper mold assembly 14.

The frame 10 comprises generally a pair of spaced, parallel extending base support beams 17 joined by end beams 18 to form a rectangular base B. A plurality of transversely extending braces 19 connect the beams 17 intermediate their ends to add rigidity to the base B.

Figure 2:
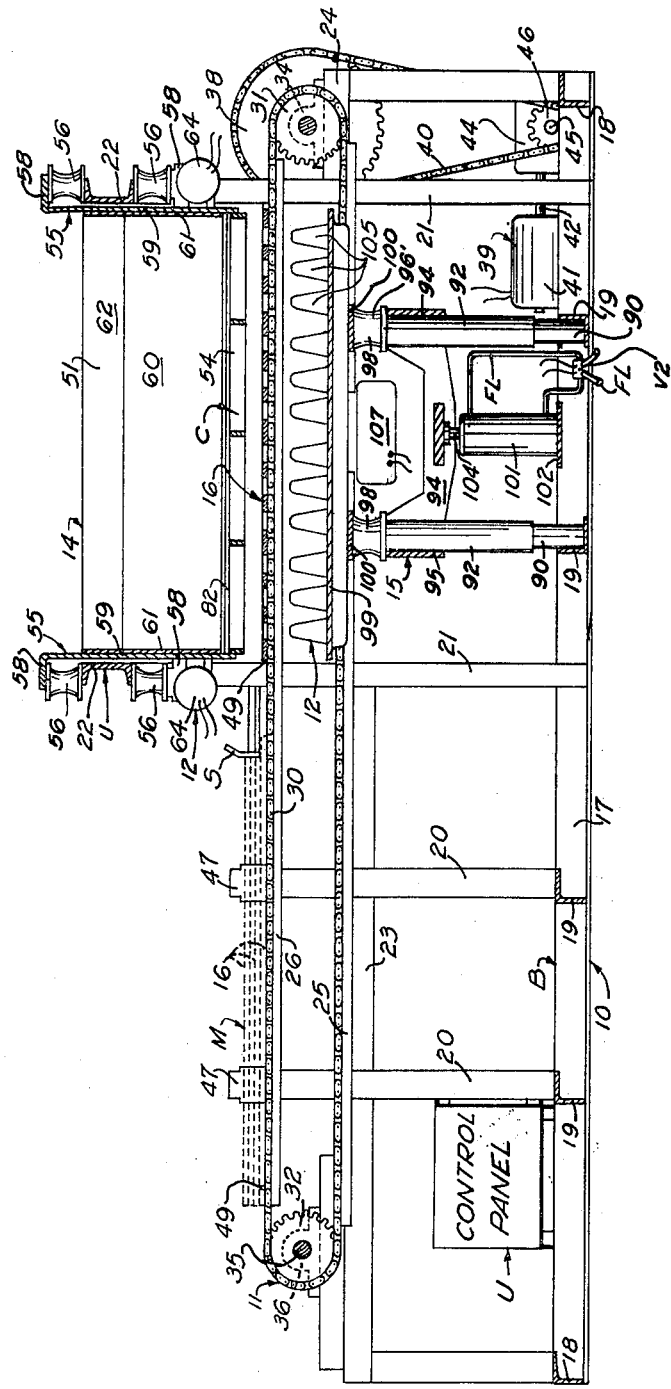
FIG. 2 is a longitudinal cross-sectional view taken along line 2—2 in FIG. 1 and showing the lower mold assembly in retracted position.

Two spaced, vertical standards 20 extend upwardly from each side of the left portion of the base B as seen in FIG. 2. Together, the standards 20 form a pallet magazine section M. Two spaced upright stanchions 21 extend upwardly from each side of the base B on the right portion thereof to form an upper mold assembly carriage U. The stanchions 21 are substantially taller than the standards 20 and are joined at their upper ends by a pair of transversely extending supports 22.

Spaced above each of the base support beams 17 and extending parallel thereto is an upper beam 23 which is attached to one of the lefthand stanchions as seen in FIG. 2 and extends to the left therefrom to join with an upright 20' attached to the left end of the base B. Each of the upper beams 23 is carried intermediate its ends by the standards 20. Extending outwardly from each of the right hand stanchions 21 in substantially the same horizontal plane as the beams 23 are a pair of discharge support beams 24 supported at their extending ends by uprights 21' attached to the right end of the base B.

Spaced inwardly of and attached to the standards 20 and stanchions 21 on each side of the frame 10 are a pair of flower chain runners 25 positioned approximately in the horizontal plane of the beams 23 and 24. Spaced upwardly of and aligned with the lower chain runners 25 are a pair of upper chain runners 26 carried by the stanchions 21 and standards 20.

The conveyor assembly 11 comprises generally a pair of spaced parallel endless conveyor chains 30 carried by a pair of spaced drive sprockets 31 at one end of the frame 10 and by a pair of spaced idler sprockets 32 at the other end of the frame 10. The drive sprockets 31 are positioned at the right end of the frame 10 as seen in FIG. 2 and are carried by a drive shaft 33 rotatably mounted in bearing blocks 34 fixedly mounted on the discharge support beams 24. The idler sprockets 32 are positioned at the left end of the frame 10 as seen in FIG. 2 and are carried by an idler shaft 35 rotatably mounted in adjustable bearing blocks 36 mounted on the upper beams 23. The bearing blocks 36 are adjustably positionable so that the tension in the chains 30 may be selectively maintained. The sprockets 31 and 32 are positioned so that the conveyor chains 30 are carried along the inside of the beams 23 and 24 and the upper flights of the chains 30 are supported by runners 26 while the lower flights of the chains 30 are supported by the runners 25.

The drive shaft 33 extends through one of the bearing blocks 34 and fixedly carries a driven sprocket 38 on the end thereof for rotation therewith. The driven sprocket 38 is drivingly connected to a drive unit 39 through a drive chain 40. The drive unit 39 comprises a motor 41 driving the input shaft 42 of a transmission 44. The transmission 44 has an output shaft 45 driven by the input shaft 42 which carries a power sprocket 46. The power sprocket 46 engages the drive chain 40 to drive the sprocket 38 and thus the conveyor chains 30. As seen in FIG. 2, the upper flights of the conveyor chains 30 are moved from the left to the right.

The upper ends of the standards 20 are provided with pallet positioning members 47 as seen in FIG. 2 which are selectively positionable on the standards 20 to properly locate a plurality of pallets 16 placed in the magazine section M for selective movement between the upper and lower mold assemblies 14 and 15 on the conveyor assembly 11. A stop member S is carried by the left hand stanchions 21 and extends to the left therefrom as seen in FIG. 2. The stop member S is positioned so that only the lowermost pallet 16 will be transferred between the upper and lower mold assemblies 14 and 15 by the chains 30 at one time.

Push lugs 49 are carried on each of the conveyor chains 30 and are located so that a push lug 49 on each of the chains 30 will engage the lowermost pallet 16 in the magazine section M and selectively transfer it between the upper and lower mold assemblies 14 and 15 as the upper flights of the chains 30 move from the left to the right as seen in FIG. 2. The lugs 49 are so positioned on the chains 30 to transfer another pallet 16 between the mold assemblies 14 and 15 as the pallet 16 between the mold assemblies 14 and 15 is transferred therefrom.

The upper mold assembly 14 as seen in FIG. 2 comprises generally a hopper 51, a gate assembly 52 and a female mold 54. A mounting assembly 55 is positioned adjacent each of the supports 22 extending between the stanchions 21 and is connected thereto through a plurality of rubber shock absorbers 56, part of the shock absorbers 56 being positioned below the supports 22 and part of the rubber shock absorbers 56 being positioned above the supports 22. A mounting bracket 58 connects each of the rubber shock absorbers 56 with mounting plates 59 rigidly attached to each end of the hopper 51 and the female mold 54 to position the mold 54 slightly below the bottom of the hopper 51. Therefore, it will be seen that the upper mold assembly 14 can be vibrated without vibrating the frame 10 since it is attached thereto by the shock absorbers 56.

Figures 3, 4:
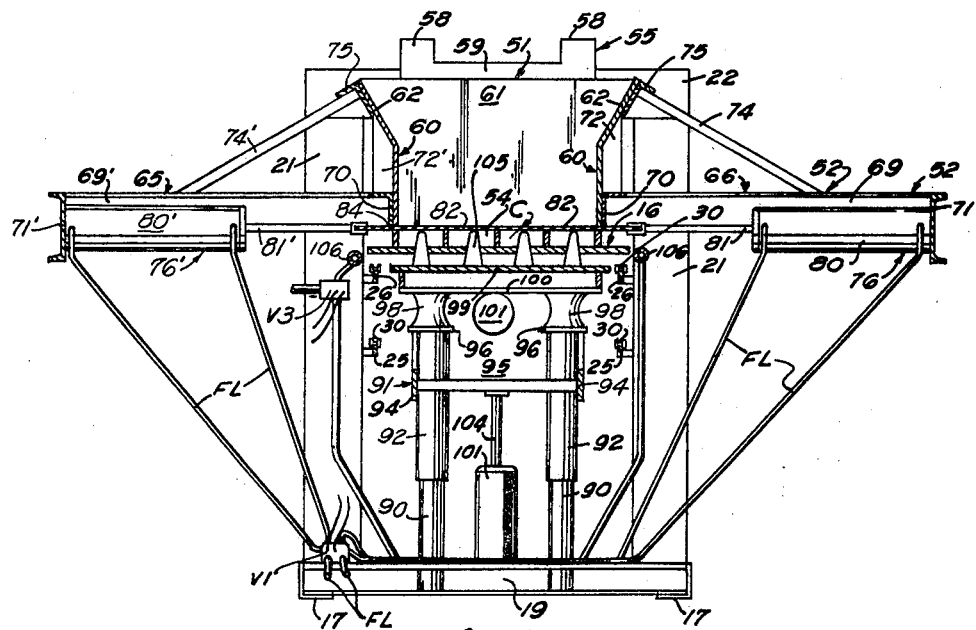
FIG. 3 is a transverse cross-sectional view taken along line 3—3 in FIG. 1 and showing the lower mold assembly in raised position.
FIG. 4 is a perspective view of the pallet used in the invention.

The hopper 51 comprises generally a pair of spaced side walls 60 joined at their ends by end walls 61. The upper portions of the side walls 60 provide an outwardly flared portion 62 as seen in FIG. 3 to facilitate the loading of the hopper 51. The top and bottom of the hopper 51 is open and the mounting assemblies 55 are connected to each of the end plates 61 extending between the side walls 60.

Attached to each of the mounting plates 59 between the mounting brackets 58 is a vibrator 64 as seen in FIG. 2. Each of the vibrators 64 is of conventional design using a rotating eccentric weight to impart a vibration to the mounting plate 59 and thus to the hopper 51 and the female mold 54. Although any of many different type vibrators may be used for attachment to the mounting plates 59, it has been found that one vibrator which has successfully accomplished the vibration of the hopper 51 and the female mold 54 is a vibrator rotating at 3600 revolutions per minute and vibrated for a period of ten seconds during the removal of the product from the mold 54. It is to be understood, however, that with different vibrators, the vibration time may be slightly modified but it is within the capabilities of one skilled in the art to adapt these other vibrators for use with the upper mold assembly 14.

Referring to FIGS. 1 and 3, it will be seen that the gate assembly 52 comprises a rear gate sub-assembly 65 and a front gate sub-assembly 66. Since the rear gate sub-assembly 65 is a mirror image of the front gate sub-assembly 66, only the front gate sub-assembly 66 will be described in detail and primes of the reference numerals used to described the front gate sub-assembly 66 will be used to indicate the corresponding parts of the rear gate sub-assembly 65.

The front gate sub-assembly 66 comprises generally a frame 68 extending substantially horizontally outward from the side wall 60 on the front side of the hopper 51 as seen in FIGS. 1 and 3. The frame 68 comprises generally a pair of side members 69 extending outwardly from the side wall 60 and converging toward each other as they extend outwardly. The ends of the side members 69 adjacent the side wall 60 are joined by an inner support brace 70 as seen in FIG. 3 and the outer extending ends thereof are joined by a support brace 71. The inner support brace 70 is connected to vertically extending reinforcing ribs 72 extending upwardly from the support brace 70 to the flange portion 62 of the hopper 5s.

As seen in FIG. 3 reinforcing struts 74 extend from the upper surface of the side members 69 to a reinforcing cross member 75 which extends along the upper edge of the flange portion 62 and connects with the upright reinforcing ribs 72. This is effective to position the side member 69 in a horizontal position and to provide a trapezoidal frame of sufficient rigidity to support the gate control unit 76 therein. Spaced outwardly from each of the side members 69 as seen in FIG. 1 is a horizontal guide tube 78 extending perpendicularly to the center line of the mold assembly 14 and being rigidly connected to the side member 69 through support struts 79.

The gate control assembly 76 is mounted on the support brace 71 and extends inwardly toward the hopper 51. The control assembly 76 comprises a fluid cylinder 80 having a movable piston rod 81 extending therefrom. The movable piston rod 81 of the cylinder 80 is connected to a flat, substantially rectangular gate 82 received in the opening 84 defined between the lower edge of the hopper 51 and the upper edge of the female mold 54. The gate 82 is of sufficient width to extend to the midpoint of the hopper 54 and works in conjunction with the gate 82' to completely seal off the bottom of the hopper 54. Guide rods 85 are provided on the gate 82 outboard of the point where the piston rod 81 is attached and are positioned so as to slidably extend through the guide tubes 78 and maintain the gate 82 in alignment.

The fluid cylinders 80 and 80' are selectively connected to a conventional pressurized fluid source (not shown) through fluid line FL and a solenoid valve V1. The valve V1 is effective to selectively control the flow of fluid introduced into the fluid cylinders 80 and 80' through the fluid lines FL to extend and retract the piston rods 81 and 81' in the cylinders 80 and 80'. Therefore, it will be seen that the piston rods 81 and 81' are extended and retracted in unison to close and open the bottom of the hopper 51.

Referring more particularly to FIGS. 2 and 3, it will be seen that the lower mold assemly 15 is carried on four upright guide rods 90 mounted on the cross members 19 between the beams 18. A table support assembly 91 is movably carried by the rods 90 and comprises four guide tubes 92 slidably received over the ends of the guide rods 90. The tubes 92 are joined at their upper ends by side braces 94 and end braces 95. A first pair of mounting brackets 96 is carried at one end of the support assembly 91 and a second pair of mounting brackets 96' is carried at the other end of the support assembly 91. The brackets 96 each mount a rubber shock absorber 98 similar in construction to the shock absorbers 56. The shock absorbers 98 carry a support table 99 through its mounting brackets 100.

A fluid cylinder 101 is mounted between the support beams 17 on a support plate 102 extending between the support beams 17 as seen in FIG. 2 and is centered under the support assembly 91 so that the movable piston rod 104 associated with the cylinder 101 can be attached to the support assembly 91 to raise and lower the support assembly 91 while being guided by the guide rods 90. The upper surface of the support table 99 is provided with a plurality of spaced male mold or core members 105 which are effective, when the support table 99 is moved upwardly by moving the support assembly 91 upwardly, to be positioned inside the female mold 54.

Centered under the support table 99 and attached thereto is a vibrator 107 similar in construction to the vibrators 64. The vibrator 107 is effective to vibrate the table 99 and core members 105 when activated. This is best seen in FIGS. 2 and 3. When the core members 105 carry a pallet 16 and postion the pallet 16 against the bottom of the female mold 54, the vibrator 107 is effective to vibrate the table 99, members 105, pallet 16 and female mold 54.

The pallets 16 define apertures A therethrough and the conveyor chains 30 are effective through the lugs 49 thereon to move a pallet 16 between the lower mold assembly 15 and the upper mold assembly 14 so that the core members 105 will extend through the apertures A defined through the pallet 16 as they move upwardly. The members 105 move the pallet 16 upwardly to bear against the lower surface of the female mold 54 as the cylinder 101 moves the support assembly 91 upwardly. Therefore, it will be seen that as each new pallet 16 is moved into position, the table 99 is raised and the pallet 16 is threaded on the core members 105 to be positioned under the female mold 54. A mix of concrete can now be received in the mold cavity C defined by the mold 54, the members 105 and the pallet 16 for the casting of concrete products.

The cylinder 101 is connected to a pressurized fluid source (not shown) through the fluid lines FL and solenoid valve V2. The valve V2 is effective, then, to selectively raise and lower the table 99 by extending and retracting the piston rod 104.

In order that the concrete products formed in the cavity C may more easily be released from the female mold 54, water spray assemblies 106 are provided along each lower edge of the mold 54. As the pallet 16 is being moved toward the lower edge of the female mold 54, the water sprays can be discharging from the water spray assemblies 106 and directed into the female mold 54 to wet the inside thereof, the excess water from the sprays falling onto the top of the pallet 16 and the core members 105 thereby wetting them. The water spray is stopped as the pallet 16 approaches the female mold 54 to prevent the external parts of the machine from becoming wet to cause rusting and other deterioration thereof.

The water spray assemblies 106 are connected to a pressurized water supply (not shown) through solenoid valve V3 which is effective to selectively supply water under pressure to the spray assemblies 106. Therefore, when the pallet 16 is moved upwardly toward the bottom of the female mold 54, the valve V3 will be activated to wet the inside of the mold 54 until the pallet 16 reaches a predetermined position.

The female mold 54 map be of any of a plurality of configurations, however, the embodiment shown herein molds a rectangularly shaped concrete product. The male mold members 105 may also be any of a plurality of configurations, however, the embodiment herein shown is of a plurality of truncated pyramids positioned on the support table 99.

OPERATION

In operation it will be seen that the system is turned on so that fluid under pressure is supplied to the solenoid valves V1 and V2 and water is supplied under pressure to the solenoid valve V3. The drive unit 39 is started so that the upper flights of the conveyor chains 30 are moved from the left to the right as seen in FIG. 2.

A plurality of pallets 16 are loaded into the magazine section M so that they are centered thereon by the positioning members 47 carried by the upright standards 20. The hopper 51 is filled with the desired concrete mix and one of the lugs 49 engages the bottom pallet 16 and transfers it into position between the upper and lower mold assemblies 14 and 15. At this time the drive unit 39 is stopped and solenoid valve V2 is energized which causes the fluid cylinder 101 to raise the support table 99 and core members 105 upwardly.

As the support table 99 moves upwardly, the solenoid valve V3 is activated so that water sprays are projected against the inside of the female mold 54, the excess falling on the core members 105 and the pallet 16. As the core members 105 are carried upwardly, they are threaded through the apertures A of the pallet 16 and carry the pallet 16 therewith up against the bottom of the female mold 54. Just prior to the pallet 16 closing the bottom of the female mold 54, the solenoid valve V3 is de-energized to stop the water spray from the water spray assemblies 106.

The gates 82 and 82' which are normally closed to seal off the bottom of the hopper 51, are opened by energizing solenoid valve V1 to retract the piston rods 81 and 81' of cylinders 80 and 80' thereby opening the bottom of the hopper 51. The vibrator 107 attached to the bottom of the support table 99 is started as the mix of concrete in the hopper 51 fills the female mold 54 around core members 105. Although it will be understood that different vibration times will be used depending on the particular configuration of the mold 54 and mold member 105, it has been found for this particular configuration, the vibrator 107 is operated for approximately 20 seconds during the filling of the mold. The vibrator 107 is then shut off as the solenoid valve V1 closes the gates 82 and 82' by extending the piston rods 81 and 81'.

At this time, the vibrators 64 are started simultaneously with the table 99 being lowered carrying the pallet 16 therewith. Although it is understood that the vibration time of the vibrator 64 may be varied with different mold configurations, it has been found that the vibration time of ten seconds with the particular configuration shown herein is sufficient to release the concrete products from the female mold 54 without causing disintegration of the concrete products therein.

It has also been found that the vibrations emitted by vibrators having rotating eccentric weights will travel in waves through the concrete product being formed. Therefore, it is necessary, in order to achieve the desired release of the female mold 54, that the vibration waves must travel from the vibrator 64 into the concrete product being formed in the female mold 54 toward the vibrator 64. The same is true for the vibrator 107 on the table 99.

After the female mold 54 has been vibrated for approximately ten seconds, the vibrators 64 are turned off and the table 99 continues to lower the pallet 16 and the concrete products thereon until the pallet 16 rests on the conveyor chain 30.

At this point, the drive unit 39 is again started and transports the pallet 16 carrying the finished product thereon out from the upper mold assembly 14 and the lower mold assembly 15. As the pallet 16 carrying the concrete product thereon is transferred from between the upper mold assembly 14 and the lower mold assembly 15, another empty pallet 16 is transferred into position between the upper mold assembly 14 and the lower mold assembly 15 by appropriate lugs 49 on the conveyor chains 30. When the new pallet 16 is properly positioned between the upper mold assembly 14 and the lower mold assembly 15, the drive unit 39 is stopped and the molding cycle is repeated.

The finished concrete product is discharged from the machine and carried by appropriate vehicles such as a conveyor or lift truck to a drying kiln for the drying of the finished concrete product. Therefore, it will be seen that the pallet 16 serves as a carrier for the molded concrete products until the product has sufficiently hardened to be self supporting.

Therefore, it will be seen that all that is necessary to do in the manufacture of molded concrete products with the present invention is to maintain the feed hopper 51 filled with a wet mix of concrete and to maintain a sufficient number of pallets 16 in the pallets magazine section M since the invention completely finishes molding the concrete products automatically. This is because a control unit U is connected to the valves V1, V2 and V3, the drive unit 39, and the vibrators 64 and 107 which is effective to convey a pallet 15 into position, spray the inside of the mold 54, raise the table 99 thereby closing the mold 54, open the gates 82 and 82' to fill the mold M, vibrate the mold M through vibrator 107 to fill the mold M, lower the table 99 while vibrating the mold 54, and subsequently conveying the pallet 16 having the product thereon out of the machine while another pallet 16 is conveyed into position.

It has been found that a suitable wet mix of concrete for use in the present invention is a mix having a slump of approximately ½ to 1½ inches in a standard test cone. It will also be noted that no pressure whatever is needed in the forming of the finished concrete product with the invention since the mix is fluid enough to properly compact itself with vibration.

It is understood that numerous other modifications, embodiments, and substitutions may be made in the invention disclosed herein without departing from the scope thereof as set forth by the appended claims.

I claim:
1. Apparatus for molding a mix of concrete having an appreciable slump comprising
   (a) support means;
   (b) a first mold assembly carried by said support means;
   (c) a second mold assembly carried by said support means, said first and second mold assemblies positioned with respect to each other to define a mold;
   (d) first means for vibrating said first mold assembly independently of said second mold assembly; and
   (e) second means for vibrating said second mold assembly independently of said first mold assembly; wherein said second mold assembly includes a pallet member defining apertures therethrough, a support table having a plurality of upstanding core members thereon, said core members being slidably received through said apertures and engageable with said pallet to position said pallet against said upper mold assembly, said pallet, core members and said first mold assembly defining a mold when so positioned.

2. Apparatus for molding a mix of concrete having an appreciable slump as set forth in claim 1 wherein said second mold assembly further includes a plurality of upright support rods carried by said support means, a plurality of guide members slidably carried by said support rods and mounting said support table, and means for selectively positioning said guide members and said support table with respect to said support rods.

3. Apparatus for molding a mix of concrete having an appreciable slump as set forth in claim 1 further including conveyor means effective to selectively position said pallets between said first and second mold assemblies.

4. Apparatus for molding a mix of concrete having an appreciable slump as set forth in claim 1 further including means for filling said first and second mold assemblies when positioned with respect to each other to form a mold said filling means comprising a hopper positioned to discharge the mix of concrete into the first mold assembly, and gate means effective to selectively connect said hopper with said first mold assembly for the discharge of the mix of concrete therein.

5. Apparatus for molding a mix of concrete having an appreciable slump as set forth in claim 4 wherein said gate means comprises a horizontally positioned slidable gate member and positioning means effective to selectively connect said hopper with said first mold assembly for the discharge of the mix of concrete therein.

6. Apparatus for molding a mix of concrete having an appreciable slump as set forth in claim 5 wherein said gate member includes a pair of gates effective, when operated in a complementary manner, to selectively connect said hopper with said first mold assembly, and further including guide means for maintaining said gates in alignment.

7. Apparatus for molding a mix of concrete having an appreciable slump as set forth in claim 6 further including control means, said control means being effective to selectively position said first and second mold assemblies with respect to each other, selectively fill said first and second mold assemblies from said filling means, selectively vibrate said first and second mold assemblies both independently and simultaneously for forming a concrete product, and subsequently separating said first and second mold assemblies to discharge said concrete product therefrom.

8. Apparatus for molding a mix of concrete having an appreciable slump as set forth in claim 6 further including fluid spray means effective to selectivley discharge fluid into said first mold assembly.

9. Apparatus for molding a mix of concrete having an appreciable slump as set forth in claim 1 wherein said second means is effective to vibrate said first and second mold assemblies simultaneously when said first and second mold assemblies are positioned to form a mold.

10. Apparatus for molding a mix of concrete having an appreciable slump as set forth in claim 1 further including fluid spray means effective to selectively discharge fluid into said first mold assembly.

References Cited

UNITED STATES PATENTS

| | | |
|---|---|---|
| 3,233,018 | 2/1966 | Ripley. |
| 3,277,551 | 10/1966 | Sekiguchi. |
| 3,309,750 | 3/1967 | Gally. |

J. SPENCER OVERHOLSER, Primary Examiner

D. W. JONES, Assistant Examiner